US010012324B2

(12) United States Patent
Tuineag

(10) Patent No.: US 10,012,324 B2
(45) Date of Patent: Jul. 3, 2018

(54) PRESSURE INDEPENDENT CONTROL VALVE

(71) Applicant: Griswold Controls, LLC, Irvine, CA (US)

(72) Inventor: Stefan I. Tuineag, Irvine, CA (US)

(73) Assignee: Griswold Controls, LLC, Irvine, CA (US)

( * ) Notice: Subject to any disclaimer, the term of this patent is extended or adjusted under 35 U.S.C. 154(b) by 0 days.

(21) Appl. No.: 15/402,025

(22) Filed: Jan. 9, 2017

(65) Prior Publication Data

US 2017/0198825 A1    Jul. 13, 2017

Related U.S. Application Data

(60) Provisional application No. 62/276,236, filed on Jan. 8, 2016.

(51) Int. Cl.
*F16K 17/04* (2006.01)
*G05D 7/01* (2006.01)
*F16K 1/12* (2006.01)
*F16K 17/10* (2006.01)

(52) U.S. Cl.
CPC .............. *F16K 17/04* (2013.01); *F16K 1/126* (2013.01); *F16K 17/10* (2013.01); *G05D 7/0106* (2013.01)

(58) Field of Classification Search
CPC .......... F16K 17/04; F16K 17/10; F16K 1/126; G05D 7/0106; G05D 7/0126; G05D 16/06; G05D 16/063; G05D 16/0644; Y10T 137/86791; Y10T 137/86759; Y10T 137/86718; Y10T 137/7793; Y10T 137/7796; Y10T 137/7822; Y10T 137/7759; Y10T 137/7769; Y10T 137/777; Y10T 137/776; Y10T 137/7785; Y10T 137/7787; Y10T 137/7788; Y10T 137/7791; Y10T 137/87917
USPC ...... 137/625.28, 625.33, 625.37, 489.5, 489, 137/488, 505.13, 505, 505.38, 486, 492, 137/492.5, 498, 487, 500, 501, 503, 613; 251/28, 61.2–61.5
See application file for complete search history.

(56) References Cited

U.S. PATENT DOCUMENTS

| | | | | |
|---|---|---|---|---|
| 2,610,819 A | * | 9/1952 | Sutton | F16K 17/10 137/625.26 |
| 3,482,777 A | * | 12/1969 | Quinn | F16K 31/365 236/12.11 |
| 6,371,156 B1 | * | 4/2002 | Walton | G05D 16/166 137/106 |
| 2004/0195533 A1 | | 10/2004 | Mall et al. | |
| 2005/0039797 A1 | | 2/2005 | Carlson | |

(Continued)

FOREIGN PATENT DOCUMENTS

WO    WO2015138021    9/2015

OTHER PUBLICATIONS

International Search Report dated Apr. 18, 2017 from International Application No. PCT/US2017/012758.

*Primary Examiner* — Michael R Reid
(74) *Attorney, Agent, or Firm* — K. David Crockett, Esq.; Crockett & Crockett, PC

(57) ABSTRACT

A flow control valve including a main valve and a pilot valve for controlling a piston of the main valve. The pilot valve is controlled in part with relatively high pressure fluid ported from a high pressure port and relatively low pressure fluid ported from a low pressure port.

18 Claims, 4 Drawing Sheets

(56) References Cited

U.S. PATENT DOCUMENTS

2012/0114849 A1    5/2012   Melcher et al.
2014/0174575 A1    6/2014   Fuller et al.

* cited by examiner

PRESSURE INDEPENDENT CONTROL VALVE

FIELD OF THE INVENTIONS

The inventions described below relate the field of pressure independent control valves.

BACKGROUND OF THE INVENTIONS

Current pressure independent control valves used in HVAC systems are installed in high flow applications and operate to maintain a constant pressure differential across a piping system despite fluctuations in the pressure of the fluid supply. These valves use typical valve discs and valve seats, and the valve disk position is altered by fluid pressure of fluid flowing through the valve and acting on a membrane fixed to a valve stem. The rapid fluid flow, which may contain debris, deteriorates the membrane, and the erosion of the membrane and collection of debris may affect operation of the valve.

SUMMARY

The devices described below provide for easy control of flow through a pressure independent control valve using an everting sleeve, where the everting sleeve is isolated from flow of fluid through the valve. The control valve includes a main valve comprising a piston operable to translate within an outlet tube to variably block outlet apertures in the outlet sleeve, and a pilot valve for controlling the piston of the main valve. The pilot valve is controlled in part with relatively high pressure fluid ported from the high pressure port in an associated piping system and relatively low pressure fluid ported from a lower pressure port in an associated piping system, applied to a pilot valve diaphragm, and also controlled with a compression spring positioned to bias the pilot valve, which in turn can be forced into greater or lesser compression against the pilot valve diaphragm by adjusting a set screw. The pilot valve is operable to pressurize an operating chamber bounded by an everting sleeve, which in turn acts on the piston disposed in a tube, to translate it relative to outlet apertures in the tube disposed to occlude or open the apertures to varying degrees. A portion of the piston, between the everting sleeve and the outlet apertures, has an outer contour closely matching the inner diameter of the outlet tube so that the everting sleeve is isolated from the flow of fluid through the main valve, and thus protected from degradation from exposure to the main flow of fluid through the valve.

DETAILED DESCRIPTION OF THE INVENTIONS

Figure 1:
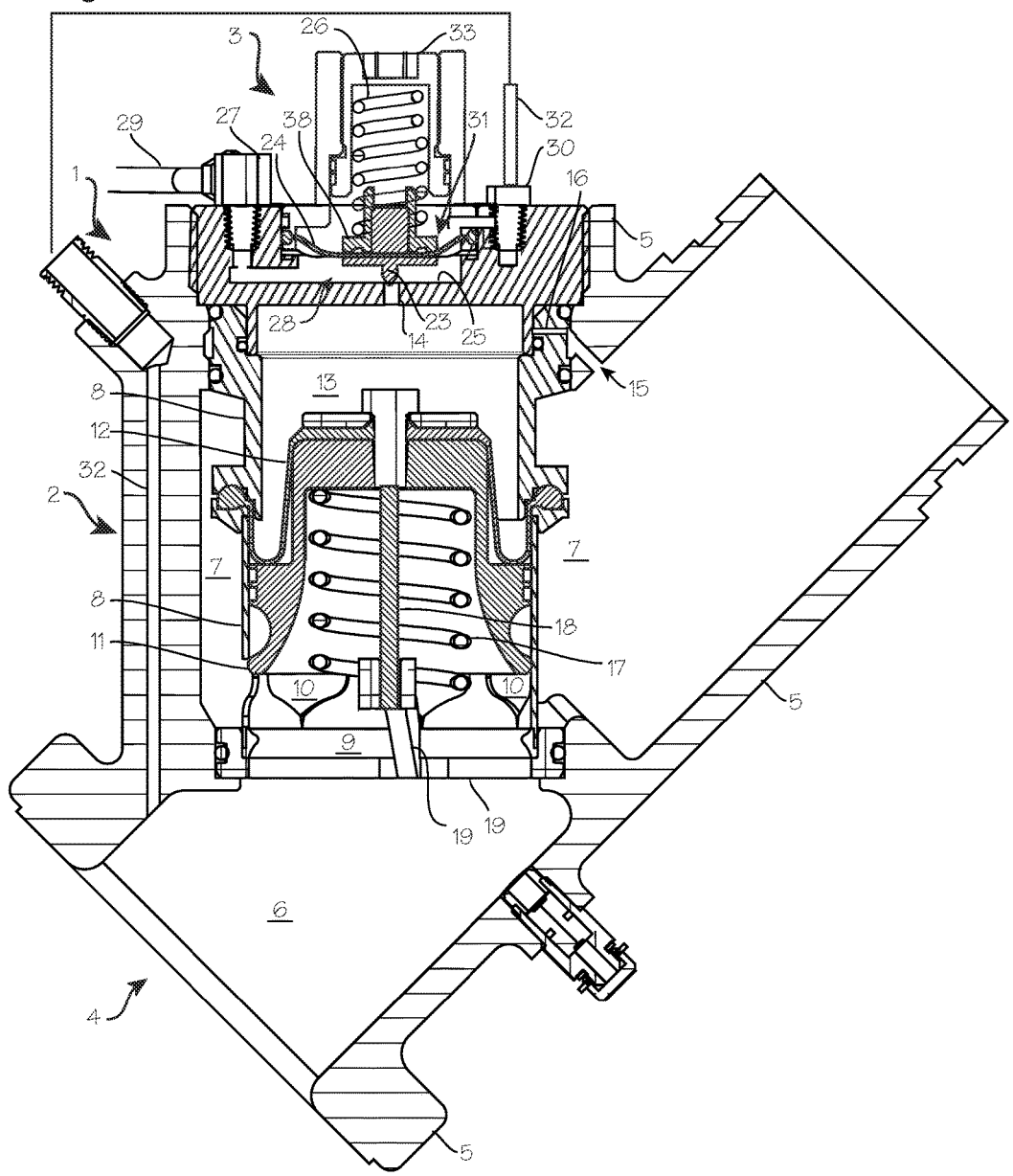
FIGS. 1 and 2 are a cross sections of the flow control valve, showing the control fluid source and the low pressure input, and their respective connections to the pilot valve.

FIG. 1 is a cross section of the flow control valve, 1. The valve is configured as a pressure independent control valve. The flow control valve is an assembly composed of a main valve 2 and a pilot valve 3. The main valve portion includes a main valve inlet 4, which is formed in the valve body 5 with a bore 6, and an outlet 7 formed of an outlet tube 8 with a bore 9 providing a fluid pathway to several outlet apertures 10 in the side wall of the outlet tube. A piston 11 and an everting sleeve 12 of main valve 2 are disposed within the bore of the tube 8. This piston is operable, through operation of the pilot valve and subsequent pressurization and eversion of the everting sleeve 12, to move longitudinally within the tube 8, toward the main valve inlet to occlude a portion of the apertures to control the rate of flow through the main valve, and, upon depressurization and inversion of the everting sleeve, away from the main valve inlet to open greater portions of the apertures to fluid flow. Above the piston and surrounding the everting sleeve, the main valve operating chamber 13 is configured to receive pressured fluid from the pilot valve through the pilot valve output port 14, and bleed pressurized fluid from the operating chamber through the relief port 15 and relief line 16. The main valve also includes a return spring 17 disposed about a shaft 18, trapped between the piston 11 and a spring support 19. The shaft serves to stabilize translation of the piston 11 within the outlet tube 8, and the spring 17 (a compression spring) serves to bias the piston toward the open, downstream position away from the main valve inlet. (The shaft may be omitted, and spring may be provided as an extension spring disposed above the piston in the operating chamber, and various other modifications may be made while retaining the benefit of isolating the everting sleeve from main fluid flow through the valve.)

The pilot valve 3 includes a plunger 23 fixed to a pilot valve diaphragm 24. Depending on pressures above and below the pilot valve diaphragm 24 and resultant deformation of the diaphragm, the plunger will seat on, or lift off of, the seat provided by the pilot side 25 of the pilot valve output port 14. The diaphragm and pilot plunger are fixed to the compression spring 26, which biases the diaphragm and plunger toward the pilot valve output port 14. The pilot valve includes a high pressure port 27 communicating with the high pressure chamber 28 under the diaphragm, and in fluid communication with the upstream, high pressure side of an associated piping system which the valve controls, through the high pressure sensing line 29, and high pressure sensing port 21 in the associated piping system (see FIG. 5), and a low pressure port 30 communicating with the low pressure chamber 31 above the diaphragm, and in fluid communication with the low pressure sensing line 32 and the downstream section (the outlet) of the associated piping system (typically, a bank of valves or other plumbing fixtures). In this configuration, where the valve is configured to be installed at the outlet of the associated piping system (see FIG. 5), the outlet of the associated piping system corresponds to the inlet of the flow control valve itself. (The valve can be installed upstream of the associated piping system, in which case the outlet of the valve will correspond to the high pressure side of the system, and the inlet will correspond to the supply pressure, and the pressure of the low pressure side of the system and will be sensed with an extended sensing line communicating from the low pressure port 30 to the low pressure side of the system.)

Downward bias on the pilot valve diaphragm and plunger may be adjusted by adjusting force on the compression spring 26 with spring adjustment actuator 33, which may be a screw or nut operable manually or with a motor. The downward bias applied by the compression spring may be altered to alter the pressure differential across the pilot valve, and across the diaphragm (and, thus, across the associated piping system), which will be maintained by the flow control valve.

FIG. 1 also shows the relief pathway for the high pressure fluid that operates the main piston 11 of the valve, and the high pressure input, and their respective connections to the valve. This view shows the high pressure sensing line 29 communicating from the upstream, high pressure side of the associated piping system through high pressure sensing port 27 to the pilot valve high pressure chamber 28, and also shows the relief path for the main valve operating chamber 13, which includes the relief port 15 (in the valve body) and a relief channel 16 (in the tube 8) which is in fluid communication with the outlet 7.

The flow rate through the valve may be adjusted by altering the pressure set point of the pilot valve (in the embodiment shown in the figures, the set point is the pressure differential across the pilot valve diaphragm 24 required to lift the diaphragm and move the pilot valve plunger 23 out of occlusive contact with the pilot valve outlet 25). To increase the flow rate through the main valve, the screw 33 is driven inward, to urge the spring plate 38 from a neutral mid-position toward the main valve inlet 4, and thus increase the closing bias on the compression spring 26. This increases the pressure differential across the diaphragm necessary to lift the plunger. This tends to close the plunger/outlet, letting pressure above the everting sleeve bleed off through the relief line, and this tends to allow the piston to move away from the inlet to open a larger portion of the outlet apertures 10. Flow through the main valve will reach the rate necessary to create the pressure differential that balances the pressure on the everting sleeve 12 achieved by the high pressure in the operating chamber 13 above the sleeve, (as reduced by the head loss in the line, the aperture, and as reduced by flow through the relief port and relief line) with the pressure of fluid below the piston. To decrease the flow rate through the main valve, the screw is driven outward, to decrease the pressure force on the spring plate 38 from a neutral mid-position away from the inlet, and thus decrease the closing bias on the compression spring. This decreases the pressure differential across the diaphragm necessary to lift the plunger. This tends to open the plunger/outlet, applying more pressure above the everting sleeve (even while pressure is bleeding off), and this tends to force the piston to move toward the inlet and close off more of the outlet apertures 10.

Figure 2:
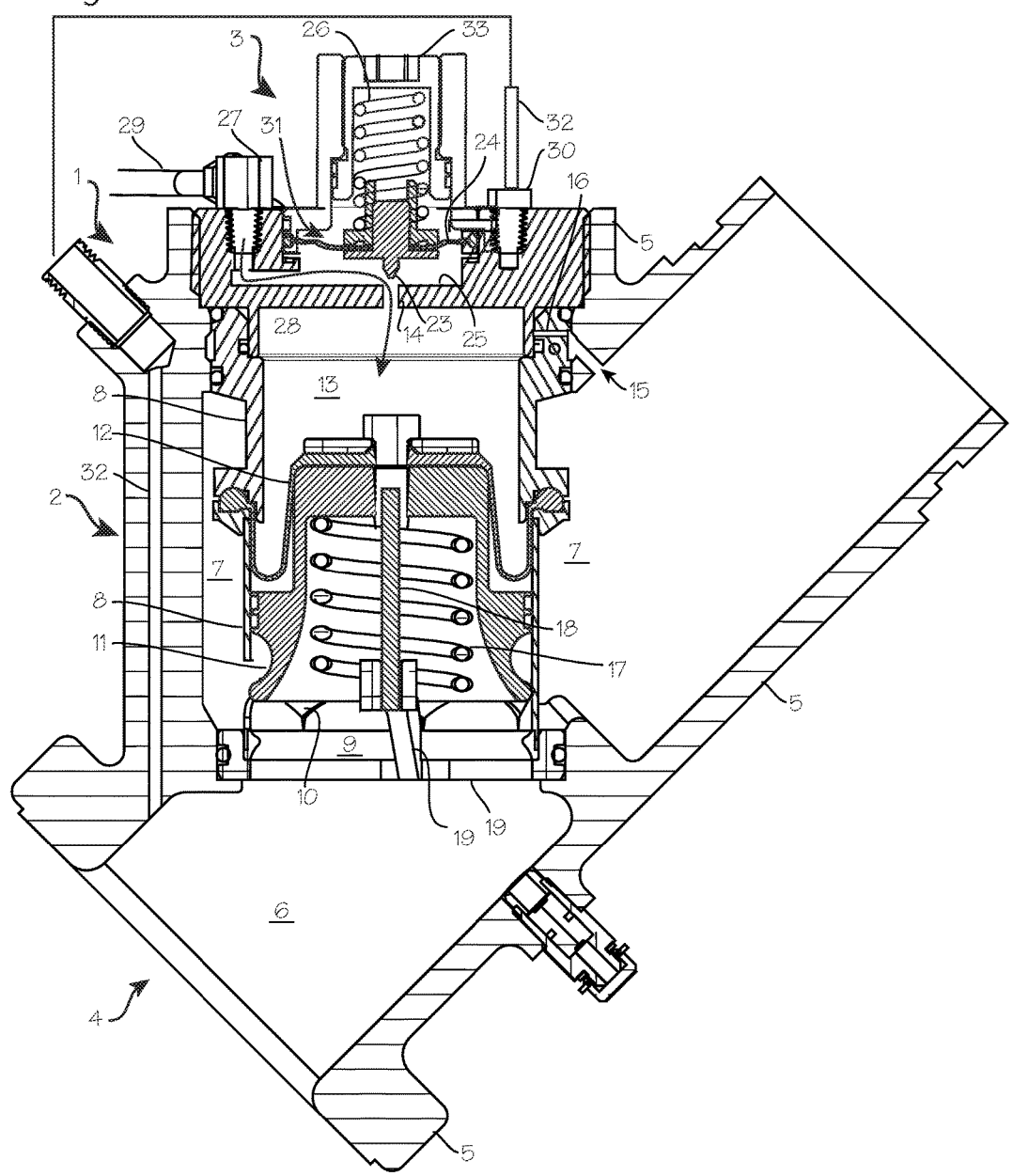

When pressure rises upstream of the associated piping system, the higher pressure is transmitted to the pilot valve high pressure side (chamber 28 in FIG. 1). At sufficiently high pressure vis-a-vis the outlet pressure (outlet of the valve manifold, for example), the diaphragm 24 lifts and the plunger 23 is moved out of the pilot valve outlet port 14, and the everting sleeve is pressurized and is everted and the piston is forced toward the inlet 4 of the main valve, so that the piston blocks portions of the apertures 10 in outlet tube 8, thus reducing flow through the valve or thus maintaining the pressure drop across the system and maintaining a constant fluid flow rate across the valve and the system even as the input pressure of the system increases (assuming the system remains otherwise unaltered). FIG. 2 illustrates the movement of the pilot valve diaphragm 24, and the plunger 23 cleared from the pilot valve outlet port 14, as well as the responsive movement of the everting sleeve 12 and piston 11 within the tube, toward the inlet end of the tube, to partially block the apertures and thus reduce flow through the valve. FIG. 2 also shows all the elements of FIG. 1.

Figure 3:
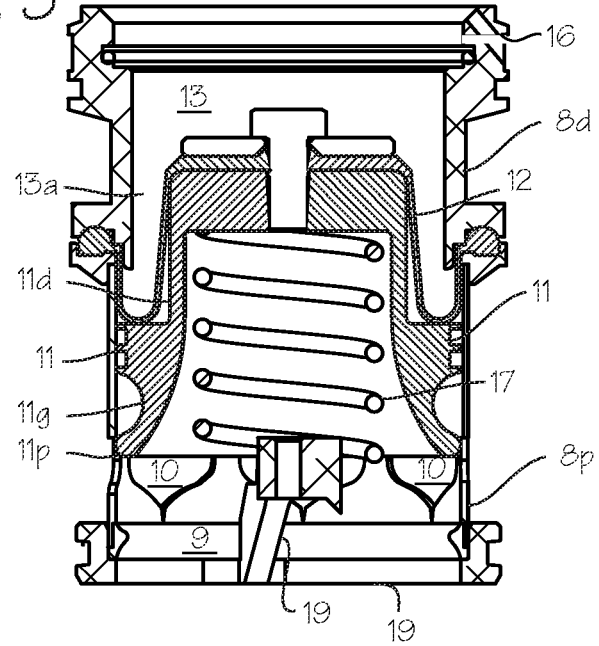
FIGS. 3 and 4 illustrate the tube and piston of the main valve shown in FIG. 1.
Figure 4:
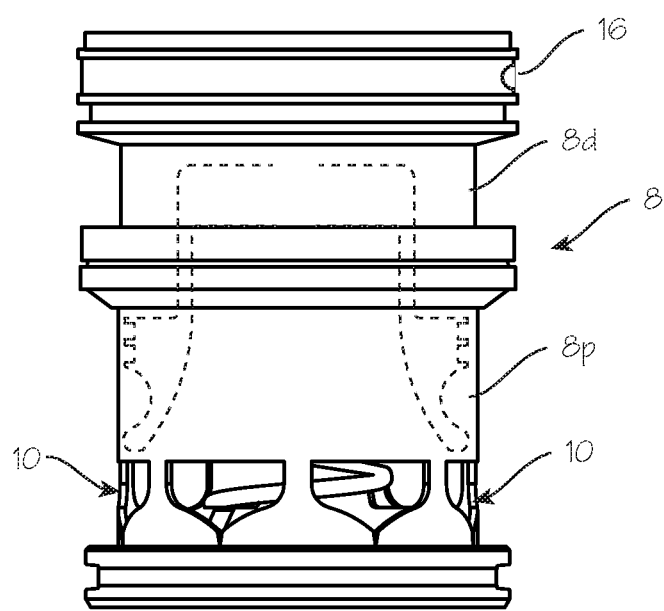

FIGS. 3 and 4 illustrate the tube and piston of the main valve shown in FIG. 1. The piston 11 serves as the closure element of the valve. A closure element is the moving part of the valve which controls flow of fluid through the valve. The tube 8 serves as the seat of the valve, which is the component against which the closure element seats, and includes apertures for fluid flow which the closure element occludes when moved into apposition to the seat. The seat comprises the tube 8, with the outlet apertures 10 in one end portion of the tube (in this case, the end open to, or closest to the inlet of the valve as illustrated (though this valve may be installed with flow in either direction)).

Referring to FIG. 3, for the embodiment in which the tube is cylindrical, the piston is also generally cylindrical, and may be solid or, as shown, generally hollow. (The hollow of the piston allows use of larger return spring, and longer rod, in a more compact configuration vis-à-vis a solid piston, and allows a longer piston, vis-à-vis a solid piston, to allow more stable movement of the piston.) More generally, it comprises a piston with at least a first portion 11p (near the inlet of the valve) with an outer diameter closely matching the inner diameter of the tube, slidably disposed within the tube, and translatable or slidable to selectively occlude the outlet apertures in the side wall of the outlet tube with this first portion. The piston first portion is disposed near the inlet of the outlet tube, and the piston second end 11d (distal, relative to the inlet of the valve), opposite the first portion, is fixed to the everting sleeve which in turn is fixed at its periphery, directly or indirectly, to the tube. The piston first portion 11p may include a circumferential groove 11g, disposed on the piston such that the groove communicates with the apertures 10 of the tube when the piston is translated toward the inlet end of the tube. The groove eliminates some of the outer surface of the piston which must slide against the inner wall of the tube, reducing the force needed to operate the piston.

The everting sleeve 12, together with the tube end 8d opposite the inlet end 8p, defines the operating chamber 13 which can be pressurized or depressurized to cause translation of the piston within the tube, and cause the piston to move into occluding relationship with the outlet apertures. The piston in this illustrated embodiment includes a second portion, such as the second end 11d, with an outer diameter smaller that the inner diameter, with an annular space 13a between the second end and the tube, such that the everting sleeve everting portion is disposed in the annular space, and everts within the annular space as the piston translates within the tube. Again, the location of the everting sleeve coaxially about the small diameter portion of the piston second end provides for a compact configuration vis-à-vis attaching the everting sleeve to a second end which is isodiametric with the first portion of the piston. In this configuration, the everting sleeve is isolated from the main fluid flow through the valve, and is exposed only to the minor, low volume flow of control fluid entering the operating chamber 13.

A return spring 17, in the embodiment in which the piston is hollow closed end tube, can be a compression spring (biased to become longer when unloaded) disposed within the bore of the hollow closed end tube, to act against the closed end and a spring support 19 proximate the open end of the tube to bias the piston to a position to unblock or open the outlet apertures, and force the piston away from the inlet end of the tube. The return spring can disposed outside the piston, and above the piston (opposite the piston first portion 11d), and may be a compression spring or extension spring (biased to shorten when unloaded), depending on its placement.

FIG. 4 is a view of the outer surface of the tube 8. The tube 8 may be made in any configuration, but conveniently comprise two parts, corresponding the inlet end and the operating chamber. The everting sleeve is fixed, at its outer periphery, to the tube, trapped between the two parts of the tube 8p (closest, or proximate to the inlet) and 8d (displaced from the inlet). In this view, the outlet apertures 10 are visible, and the relation between the high pressure relief line 16 through the tube is also shown. This port opens to an annular space between the tube and the valve body, which may be provided so that the relief flow path is not dependent on rotational orientation the tube within the valve body (that is, relief port 16 and 15 need not be precisely aligned).

Figure 5:
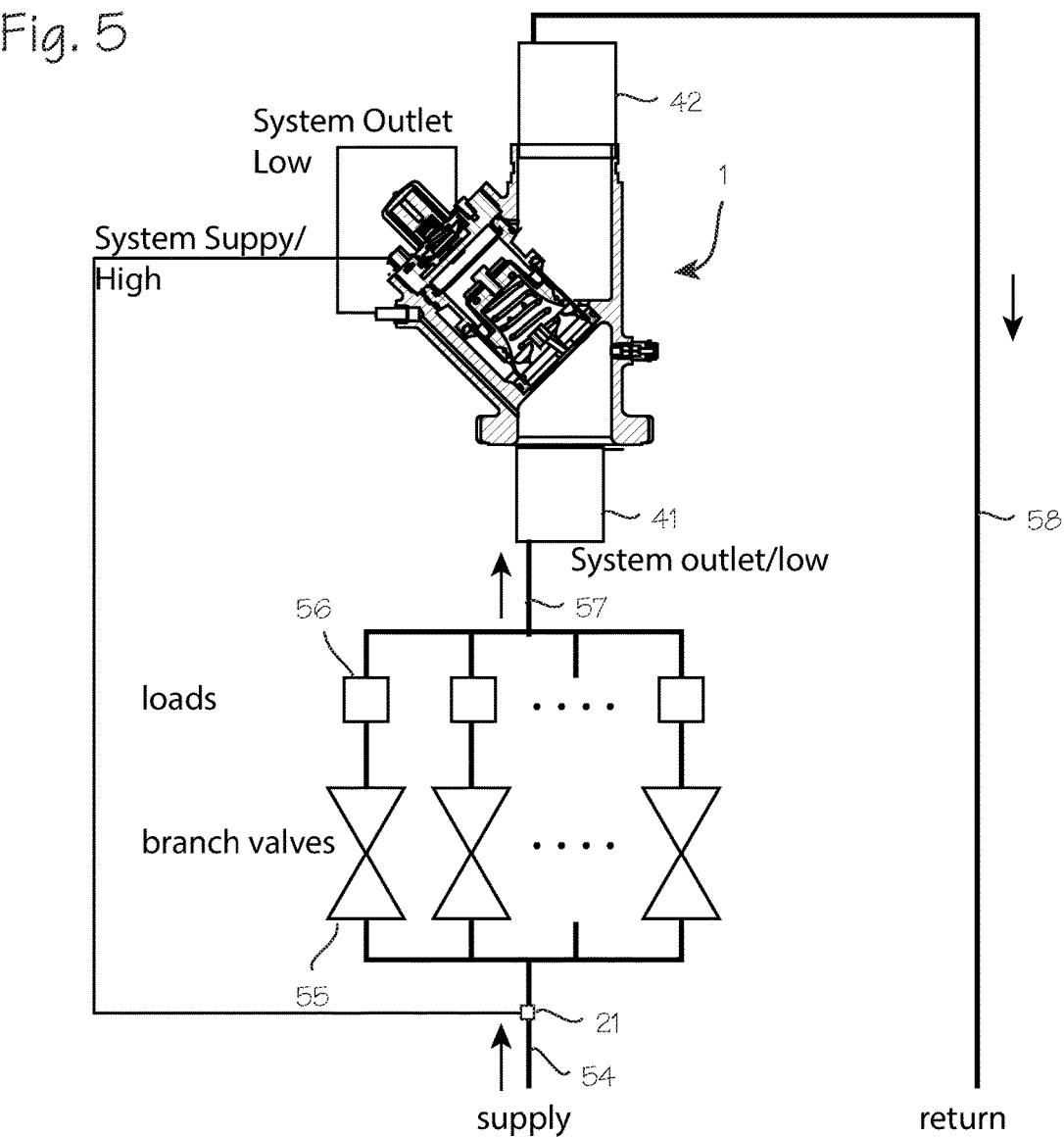
FIG. 5 is a schematic of a piping system, such as an HVAC system, in which the valve of FIG. 1 may be used.

FIG. 5 is a schematic of a piping system, such as an HVAC system, in which the valve of FIG. 1 may be used. The valve is installed in a piping system, with an upstream inlet pipe 41 and a downstream outlet pipe 42, establishing respective upstream and downstream sides of the flow control valve. The system may include a supply line 54, any number of branch valves 55 in various branches used to adjust flow to various loads 56, and an outlet line 57. The control valve 1 is installed in conduit comprising the upstream and downstream pipes 41 and 42, and a return line 58. In an HVAC system, the branch valves may be inexpensive pressure independent control valves (such as Griswold PIC-V®, MVP® and PIM valves), manually operated ball valves or throttle valves, and the loads might be individual rooms to be supplied with fluid through a main supply pipe, a manifold or bank of branch valves, the flow control valve, and a return. As shown in this figure, the control valve 1 is installed in the overall piping system, in the return line or in the supply line, with the high pressure sensing line extension 29 communicating from the high pressure sensing port 27 in the valve, through the high pressure line 29 and high pressure sensing port 21 in the supply line 54, upstream of the branch valves 55. The high pressure in the supply line is communicated to the high pressure chamber in the pilot valve through this pathway.

The valve may be provided in various sizes, with apertures and piston movement configured for control within various ranges of flow rates.

As described above in relation to FIGS. 1 through 4, the flow control valve generally includes the main valve (2) with its inlet 4 and outlet 7, with the main valve operable to throttle fluid flow through the conduit (41, 42) and maintain a constant pressure drop over an associated piping system. The main valve is controlled by the pilot valve (3), which is operable to control a position of the main valve (2). The pilot valve has a control spring (33) and the amount of pressure applied by the control spring determines a pressure set point of the pilot valve. The valve is installed in a piping system to control an associated piping system to maintain a constant pressure drop across the associated piping system, by fixing the high pressure sensing port in fluid communication with an inlet of the associated piping system, upstream of the associated piping system, and fixing the low pressure sensing port in fluid communication with the outlet of the associated piping system, downstream of the associated piping system (with the valve either upstream of downstream of the branch). The valve may be used also to maintain a constant pressure drop across the valve itself. In this configuration:

The high pressure port (27) would communicate with a high pressure region proximate the inlet of the main valve (2), in fluid communication with the pilot valve (3), while a low pressure sensing port 22 would communicate with a low pressure region downstream of the valve itself, proximate the outlet of the valve, such that the inlet and outlet of the valve are in fluid communication with the pilot valve (3).

Several inventive aspects of the pressure independent control valve have been described. The benefits each of the various inventions may be obtained in combination with the other inventions, or in isolation without the other inventions. For example, the benefits of the configuration of the piston and everting sleeve which provides for isolation of the everting sleeve from the main fluid flow may be achieved with or without the benefits of compact construction arising from disposing the everting sleeve in the annular gap between the piston and the tube, and both may be obtained with or without the benefits of compact construction arising from disposing the return spring within a hollow piston.

The benefits of the configuration of the piston and everting sleeve which provide for isolation of the everting sleeve from the main fluid flow may be achieved with or without the benefits of the pilot valve, and may be used in a valve operated by applying pressure to the everting sleeve through other mechanisms such as pressurizing the operating chamber with fluid from an independent source, with or without feedback from other sources. Generally, the isolation feature can be achieved with a main valve (2) having an inlet (4) and an outlet (7), said main valve comprising a tube (8) having a first, inlet end and a second end opposite the first, inlet end, with an aperture in a side wall of the tube near the first inlet end, said tube having an inner diameter, with a piston having a first portion (11p) with an outer diameter, said piston slidably disposed within the tube such that the piston first portion is proximate the tube first, inlet end, (8p), and said piston can be moved into and out of occluding relationship with the aperture (10), said piston having a second portion (11d), opposite the piston first portion relative to the first, inlet end of the tube; an everting sleeve having a perimeter fixed to the tube, said everting sleeve fixed to the piston at the piston second portion, said everting sleeve and tube second end defining an operating chamber; a pilot valve having an outlet communicating with the operating chamber, said pilot valve operable to pressurize the operating chamber and thereby force the piston into occluding relationship with the aperture; wherein the outer diameter of the piston first portion closely matches the inner diameter of the tube, thereby preventing flow of fluid through the tube from the first, inlet end to the tube second end, whereby the everting sleeve is isolated from fluid flowing through the first, inlet end of the tube and the aperture. Additional features may be used to provide additional advantages, such as the annular space which hold the everting sleeve, the hollow the piston which accommodates the return spring, and the pilot valve with is connections to an inlet and outlet of an associated piping system.

The benefits of compact construction arising from disposing the everting sleeve in the annular gap between the piston and the tube, or disposing the return spring within the hollow of the piston, may be achieved with or without the other features which provide for isolation of the everting sleeve or operation through a pilot valve While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A flow control valve comprising:
 a main valve (2) having an inlet (4) and an outlet (7), said main valve comprising a tube (8) having a first, inlet end and a second end opposite the first, inlet end, with an aperture in a side wall of the tube near the first inlet end, said tube having an inner diameter, with a piston (11) having a first portion with an outer diameter, said piston (11) slidably disposed within the tube such that the piston first portion (11p) is proximate the tube first, inlet end, and said piston (11) can be moved into and out of an occluding relationship with the aperture, said piston (11) having a second portion (11d), opposite the piston first portion (11p) relative to the first, inlet end of the tube;
 an everting sleeve having a perimeter fixed to the tube, said everting sleeve fixed to the piston (11) at the piston second portion (11d), said everting sleeve and tube second end defining an operating chamber (13);
 a pilot valve having a pilot valve outlet port (14) communicating with the operating chamber (13), said pilot valve operable to pressurize the operating chamber (13) and thereby force the piston (11) into an occluding relationship with the aperture;
 wherein the outer diameter of the piston first portion (11p) closely matches the inner diameter of the tube, thereby preventing flow of fluid through the tube from the first, inlet end through the aperture, whereby the everting sleeve is isolated from fluid flowing through the first, inlet end of the tube and the aperture; wherein
 the pilot valve (3) comprises a plunger (23) fixed to a diaphragm (24), said diaphragm operable to move the plunger into and out of an occluding relationship with the pilot valve outlet port (14), a high pressure port (27) communicating with a high pressure chamber (28) on a first side of the diaphragm, and a low pressure port (30) communicating with a low pressure chamber (31) on a second side of the diaphragm, wherein the pilot valve outlet port communicates between the high pressure chamber (28) and the operating chamber (13).

2. The flow control valve of claim 1, wherein:
 the piston second portion (11d) has an outer diameter smaller than the outer diameter of the piston first portion (11p), thereby creating an annular space (13a) between the piston second portion (11d) and the tube (8); and
 an everting portion of the everting sleeve is disposed in the annular space (13a).

3. The flow control valve of claim 1, further comprising:
 a high pressure relief line (16) communicating from the operating chamber (13) to a relief port (15) in the valve, for bleeding high pressure fluid from the operating chamber (13).

4. The flow control valve of claim 1, wherein:
 the pilot valve and the main valve are disposed coaxially with each other, and are disposed immediately adjacent to each other within the flow control valve, such that the pilot valve outlet port (14) opens directly into the operating chamber (13).

5. A flow control valve comprising:
 a main valve (2) having an inlet (4) and an outlet (7), said main valve comprising a tube (8) having a first, inlet end and a second end opposite the first, inlet end, with an aperture in a side wall of the tube near the first inlet end, said tube having an inner diameter, with a piston (11) having a first portion with an outer diameter, said piston (11) slidably disposed within the tube such that the piston first portion (11p) is proximate the tube first, inlet end, and said piston (11) can be moved into and out of an occluding relationship with the aperture, said piston (11) having a second portion (11d), opposite the piston first portion (11p) relative to the first, inlet end of the tube;
 an everting sleeve having a perimeter fixed to the tube, said everting sleeve fixed to the piston (11) at the piston second portion (11d), said everting sleeve and tube second end defining an operating chamber (13);
 a pilot valve having a pilot valve outlet port (14) communicating with the operating chamber (13), said pilot valve operable to pressurize the operating chamber (13) and thereby force the piston (11) into an occluding relationship with the aperture;
 wherein the outer diameter of the piston first portion (11p) closely matches the inner diameter of the tube, thereby preventing flow of fluid through the tube from the first, inlet end through the aperture, whereby the everting sleeve is isolated from fluid flowing through the first, inlet end of the tube and the aperture; wherein
 the piston (11) comprises a hollow closed-ended tube, with the closed end at the piston second portion (11d), and an open bore in the piston first portion (11p), and
 the flow control valve further comprises a return spring (17), disposed within the open bore of the piston (11) and engaging the closed end and a spring support disposed proximate the open bore, said return spring (17) operable to bias the piston (11) away from the first, inlet end (8p) of the tube (8).

6. The flow control valve of claim 5, wherein:
 the piston second portion (11d) has an outer diameter smaller than the outer diameter of the piston first portion (11p), thereby creating an annular space (13a) between the piston second portion (11d) and the tube (8); and
 an everting portion of the everting sleeve is disposed in the annular space (13a).

7. The flow control valve of claim 5, further comprising:
 a high pressure relief line (16) communicating from the operating chamber (13) to a relief port (15) in the valve, for bleeding high pressure fluid from the operating chamber (13).

8. The flow control valve of claim 5, wherein:
 the pilot valve and the main valve are disposed coaxially with each other, and are disposed immediately adjacent to each other within the flow control valve, such that the pilot valve outlet port (14) opens directly into the operating chamber (13).

9. A piping system comprising:
 a piping system (54-57) comprising at least one branch valve, said piping system (54-57) comprising an inlet line (54) upstream of the branch valve (55) and an outlet line (57) downstream of the branch valve;
 a flow control valve (1) disposed in fluid communication with the piping system (54-57), either upstream or downstream of the piping system (54-57), such that all fluid flowing through the piping system (54-57) flows through the flow control valve;
 the flow control valve (1) comprising:
 a main valve (2) having an inlet (4) and an outlet (7), said main valve comprising a tube (8) having a first, inlet end and a second end opposite the first, inlet end, with an aperture in a side wall of the tube near the first inlet end, said tube having an inner diameter, with a piston

(11) having a first portion with an outer diameter, said piston (11) slidably disposed within the tube such that the piston first portion (11p) is proximate the tube first, inlet end, and said piston (11) can be moved into and out of an occluding relationship with the aperture, said piston (11) having a second portion, opposite the piston first portion (11p) relative to the first, inlet end of the tube;

an everting sleeve having a perimeter fixed to the tube, said everting sleeve fixed to the piston (11) at the piston second portion (11d), said everting sleeve and tube second end defining an operating chamber (13);

a pilot valve having pilot valve outlet port (14) communicating with the operating chamber (13), said pilot valve operable to pressurize the operating chamber (13) and thereby force the piston (11) into an occluding relationship with the aperture;

wherein the outer diameter of the piston first portion (11p) closely matches the inner diameter of the tube, thereby preventing flow of fluid through the tube from the first, inlet end to the tube second end, whereby the everting sleeve is isolated from fluid flowing through the first, inlet end of the tube and the aperture.

10. The piping system of claim 9, wherein:

the pilot valve (3) comprises a plunger (23) fixed to a diaphragm (24), said diaphragm operable to move the plunger into and out of an occluding relationship with the pilot valve outlet port (14), a high pressure port (27) communicating with a high pressure chamber (28) on a first side of the diaphragm, and a low pressure port (30) communicating with a low pressure chamber (31) on a second side of the diaphragm, wherein the pilot valve outlet port communicates between the high pressure chamber (28) and the operating chamber (13);

wherein the high pressure chamber (28) is in fluid communication, through the high pressure port (27) with the inlet pipe (54) and the low pressure chamber is in fluid communication, through the low pressure port (30) with the outlet pipe (41).

11. The piping system of claim 9, wherein:

the piston (11) comprises a hollow closed-ended tube, with the closed end at the piston second portion (11d), and an open bore at the piston first portion (11p), and the flow control valve further comprises;

a return spring (17), disposed within the open bore of the piston (11) and engaging the closed end and a spring support disposed proximate the open bore, said return spring (17) operable to bias the piston (11) away from the first, inlet end (8p) of the tube (8).

12. The piping system of claim 9, wherein:

the piston second portion (11d) has an outer diameter smaller than the outer diameter of the piston first portion (11p), thereby creating an annular space (13a) between the piston second portion (11d) and the tube (8); and an everting portion of the everting sleeve is disposed in the annular space (13a).

13. The piping system of claim 9, further comprising:

a high pressure relief line (16) communicating from the operating chamber (13) to a relief port (15) in the valve, for bleeding high pressure fluid from the operating chamber (13).

14. The piping system of claim 9, wherein:

the pilot valve and the main valve are disposed coaxially with each other, and are disposed immediately adjacent each other within the flow control valve, such that the pilot valve outlet port (14) opens directly into the operating chamber (13).

15. A flow control valve comprising:

a main valve (2) having an inlet (4) and an outlet (7), said main valve comprising a tube (8) having a first, inlet end and a second end opposite the first, inlet end, with an aperture in a side wall of the tube near the first inlet end, said tube having an inner diameter, with a piston (11) having a first portion with an outer diameter, said piston (11) slidably disposed within the tube such that the piston first portion (11p) is proximate the tube first, inlet end, and said piston (11) can be moved into and out of an occluding relationship with the aperture, said piston (11) having a second portion, opposite the piston first portion (11p) relative to the first, inlet end of the tube;

an everting sleeve (12) having a perimeter fixed to the tube, said everting sleeve fixed to the piston (11) at the piston second portion (11d), said everting sleeve and the tube second end defining an operating chamber (13);

the piston (11) second portion has an outer diameter smaller than the outer diameter of the piston first portion (11p), thereby creating an annular space (13a) between the piston second portion (11d) and the tube (8); and an everting portion of the everting sleeve (12) is disposed in the annular space (13a);

a pilot valve having a pilot valve outlet port (14) communicating with the operating chamber (13), said pilot valve operable to pressurize the operating chamber (13) and thereby force the piston (11) into an occluding relationship with the aperture; wherein the pilot valve (3) comprises a plunger (23) fixed to a diaphragm (24), said diaphragm operable to move the plunger into and out of occluding relationship with a pilot valve outlet port (14), a high pressure port (27) communicating with a high pressure chamber (28) on a first side of the diaphragm, and a low pressure port (30) communicating with a low pressure chamber (31) on a second side of the diaphragm, wherein the pilot valve outlet port communicates between the high pressure chamber (28) and the operating chamber (13).

16. The flow control valve of claim 15, further comprising:

a high pressure relief line (16) communicating from the operating chamber (13) to a relief port (15) in the valve, for bleeding high pressure fluid from the operating chamber (13).

17. The flow control valve of claim 15, wherein:

the pilot valve and the main valve are disposed coaxially with each other, and are disposed immediately adjacent to each other within the flow control valve, such that the pilot valve outlet port (14) opens directly into the operating chamber (13).

18. A flow control valve comprising:

a main valve (2) having an inlet (4) and an outlet (7), said main valve comprising a tube (8) having a first, inlet end and a second end opposite the first, inlet end, with an aperture in a side wall of the tube near the first inlet end, said tube having an inner diameter, with a piston (11) having a first portion with an outer diameter, said piston (11) slidably disposed within the tube such that the piston first portion (11p) is proximate the tube first, inlet end, and said piston (11) can be moved into and out of an occluding relationship with the aperture, said piston (11) having a second portion, opposite the piston first portion (11*p*) relative to the first, inlet end of the tube;

an everting sleeve (12) having a perimeter fixed to the tube, said everting sleeve fixed to the piston (11) at the piston second portion (11*d*), said everting sleeve and the tube second end defining an operating chamber (13);

the piston (11) second portion has an outer diameter smaller than the outer diameter of the piston first portion (11*p*), thereby creating an annular space (13*a*) between the piston second portion (11*d*) and the tube (8); and an everting portion of the everting sleeve (12) is disposed in the annular space (13*a*); wherein the piston (11) comprises a hollow closed-ended tube, with the closed end at the piston second portion (11*d*), and an open bore in the piston first portion (11*p*), and the flow control valve further comprises a return spring (17), disposed within the open bore of the piston (11) and engaging the closed end and a spring support disposed proximate the open bore, said return spring (17) operable to bias the piston (11) away from the first, inlet end (8*p*) of the tube (8).

\* \* \* \* \*